United States Patent Office 3,155,664
Patented Nov. 3, 1964

3,155,664
DERIVATIVES OF THEOPHYLLINE
Albert Schlesinger, Jackson Heights, Harold Blumberg, Flushing, and Nathan Weiner, Rego Park, N.Y., assignors to Endo Laboratories Inc., Richmond Hill, N.Y., a corporation of New York
No Drawing. Filed Nov. 13, 1959, Ser. No. 852,622
2 Claims. (Cl. 260—256)

The present invention relates to theophylline-7-ethylhydrazines, their acid addition salts, and the preparation thereof.

The new group of theophylline-7-ethylhydrazines of the present invention correspond to the formula $$\begin{array}{c} CH_3-N-C=O \\ | \quad | \\ O=C \quad C-N-CH_2-CH_2-NH-NH-R \\ | \quad | \diagdown CH \\ | \quad | \diagup \\ CH_3-N-C \end{array} \quad (I)$$

where R stands for hydrogen; a straight or branched alkyl with 1 to 10 carbon atoms (e.g., methyl, ethyl, propyl, isopropyl, butyl, isobutyl, pentyl, heptyl, etc.) or aralkyl (e.g., benzyl, phenylethyl, phenylpropyl, etc.) or cyclic alkyl (e.g., cyclopropyl, cyclopentyl, cyclohexyl, etc.) or basic radicals such as tropyl, piperidyl, aminoalkyl or aminoaralkyl.

The said theophylline-7-ethylhydrazines can be prepared in a number of ways. Thus, for example, the 7-(2'-chloroethyl)-theophylline $$\begin{array}{c} CH_3-N-C=O \\ | \quad | \\ O=C \quad C-N-CH_2-CH_2-Cl \\ | \quad | \diagdown CH \\ | \quad | \diagup \\ CH_3-N-C-N \end{array} \quad (II)$$

can be reacted with hydrazine hydrate or mono-substituted hydrazines of the formula $$R-NH-NH_2 \quad (III)$$

wherein R has the significance above defined.

Alternatively, the substituted theophylline-7-ethylhydrazines may be prepared by condensing the 7-(2'-hydrazinoethyl)-theophylline with the corresponding ketones, which upon reduction, yield the corresponding substituted hydrazine compounds of Formula I.

It is possible, if desired, to combine the 7-(2'-hydrazinoethyl)-theophylline with the corresponding ketones in ethanol or water solution and submit this mixture directly to hydrogenation, without first isolating the corresponding hydrazones.

This is a preferred method of preparing such hydrazine derivatives of Formula I. The reduction of the aforementioned (but not isolated) hydrazones to the corresponding hydrazine derivatives can be effected with the aid of nascent or catalytically activated hydrogen. Suitable catalysts for this purpose are platinum and nickel. The hydrogenation can be carried out at normal or elevated temperatures and under atmospheric or higher pressure.

Suitable ketones for the purpose of the present invention are, for example: acetone; methylethyl ketone; diisobutyl ketone; 3-pentanone; 4-heptanone; di-cyclopropyl ketone; cyclopentanone; cyclohexanone; acetophenone; phenylacetone; diphenylacetone; benzophenone; benzoylpyridines; piperidones; tropinone; camphor; 1-dialkyl amino-3-butanones.

The new theophylline-7-ethylhydrazines of the present invention are bases, which form stable addition salts with organic acids and inorganic acids. Thus salts may be formed with a wide variety of acids, for example, hydrochloric acid, hydrobromic acid, phosphoric acid, sulfuric acid, acetic acid, citric acid, benzoic acid, tartaric acid, etc.

The said new theophylline-7-ethylhydrazines have a wide variety of uses. They can be starting materials for heterocyclic derivatives such as substituted pyrazolidines.

The hydrazines of the present invention per se possess valuable pharmacodynamic properties, which are therapeutically of high interest. Thus they have strong stimulating effects and also have blood pressure-lowering action, combined with low toxicity.

The following examples set forth by way of illustration, present preferred embodiments of this invention:

Example 1

24 grams of 7-(2'-chloroethyl)-theophylline and 20 grams of hydrazine hydrate (85%) in 400 cc. of isopropanol are refluxed for 16 hours. The solution is cooled to room temperature and 10 cc. of sodium hydroxide (40%) is added. The solvents are then distilled off under reduced pressure. The dry residue is then again dissolved in 400 cc. of isopropanol by heating to reflux, filtered hot, and the filtrate cooled to room temperature.

By adding a solution of hydrochloric acid in ethanol to the isopropanol solution, a crystalline precipitate forms. This precipitate is then recrystallized from 150 cc. of ethanol (85%). The 7-(2'-hydrazinoethyl)-theophylline hydrochloride, so obtained, melts at 225° C.

Analysis. — $C_9H_{14}N_6O_2HCl$: Calc. — Cl, 12.91%. Found—Cl, 12.94%.

Example 2

13.7 grams of 7-(2'-hydrazinoethyl)-theophylline.HCl, the ultimate product of Example 1, is dissolved in a mixture of 30 cc. of water and 30 cc. of ethanol. To this solution is added 5 grams of acetone and 0.4 gram of platinum oxide catalyst. This solution is then submitted to hydrogenation at an initial pressure of 39 pounds. After two hours, the theoretical amount of hydrogen is taken up. The reaction mixture is filtered to remove the catalyst, and the filtrate is evaporated in vacuo.

The residue is then dissolved in 140 cc. of ethanol (90%), filtered hot and then cooled. The precipitated crystalline material is filtered on a Buchner funnel, washed with cold ethanol and dried at 105° C. The thus-obtained N-(theophylline-7-ethyl)-N'-(isopropyl)-hydrazine hydrochloride melts at 234° C.

Analysis. — $C_{12}H_{20}N_6O_2.HCl$: Calc. — Cl, 11.2%. Found.—Cl, 11.12%.

Example 3

13.7 grams of 7-(2'-hydrazinoethyl)-theophylline.HCl and 5.5 grams of dicyclopropyl ketone are dissolved in 20 cc. of water and 20 cc. of ethanol. After adding 0.4 gram of platinum oxide catalyst, this solution is submitted to hydrogenation at room temperature at an initial pressure of 46 pounds. The theoretical amount of hydrogen is absorbed in 24 hours. The catalyst is filtered off, and the filtrate is evaporated to dryness. The residue is crystallized from 150 cc. of ethanol. The N-(theophylline-7-ethyl)-N'-(dicyclopropyl-methyl)-hydrazine hydrochloride so obtained melts at 157° C.

Analysis. — $C_{16}H_{24}N_6O_2.HCl$: Calc. — Cl, 9.61%. Found.—Cl, 9.66%.

Example 4

13.7 grams of 7-(2'-hydrazinoethyl)-theophylline.HCl and 5 grams of methylethyl ketone in 40 cc. of water, including 0.5 gram of platinum catalyst, are hydrogenated at room temperature at an initial pressure of 29 pounds. After 20 hours the theoretical amount of hydrogen is taken up. The filtered solution is evaporated and the residue is crystallized from 130 cc. of ethanol (90%).

The isolated N-(theophylline-7-ethyl)-N'(2'-butyl)-hydrazine hydrochloride melts at 203° C.

Analysis. — $C_{13}H_{22}N_6O_2.HCl$: Calc. — Cl, 10.72%. Found.—Cl, 10.68%.

Example 5

13.7 grams of 7-(2'-hydrazinoethyl)-theophylline.HCl and 9 grams of 4-benzoyl-pyridine in 30 cc. of water and 30 cc. of ethanol with 5 cc. of concentrated hydrochloric acid and 0.4 gram of platinum catalyst are hydrogenated at room temperature at an initial pressure of 50 pounds. After 24 hours, the theoretical amount of hydrogen is absorbed for effecting the reduction of the hydrazone and the pyridine.

The reaction mixture is filtered; and the filtrate evaporated. The residue is crystallized from 50 cc. of ethanol. the thus-obtained N-(theophylline-7-ethyl)-N'-(4-piperidyl-phenyl-methyl)-hydrazine-dihydrochloride melts at 176° C.

Anaylsis. — $C_{21}H_{29}N_7O_2.2HCl$: Calc. — Cl, 14.64%. Found.—Cl, 14.87%.

Example 6

13.7 grams of 7-(2'-hydrazinoethyl)-theophylline.HCl and 7 grams of phenylacetone in 30 cc. of water and 30 cc. of ethanol with 0.5 gram of $PtO_2$ catalyst are submitted to hydrogenation at room temperature at an initial pressure of 35 pounds. After two hours, the hydrogenation stops. The filtrate is evaporated and the residue crystallized from 100 cc. of ethanol. The thus-obtained N-(theophylline-7-ethyl)-N'-(1-benzyl-ethyl)-hydrazine hydrochloride melts at 204° C.

Analysis. — $C_{18}H_{24}N_6O_2.HCl$: Calc. — Cl, 9.26%. Found.—Cl, 9.26%.

Example 7

N-(theophylline-7-ethyl) - N'-(1'-phenyl-ethyl)-hydrazine.HCl is prepared by the same method as the compound of Example 6, using 7 grams of acetophenone instead of phenylacetone. It is recrystallized from 90% ethanol. Melting point: 190° C.

Analysis. — $C_{17}H_{22}N_6O_2.HCl$: Calc. — Cl, 9.35%. Found.—Cl, 9.36%.

Example 8

N-(theophylline-7-ethyl)-N'-(3'-pentyl)-hydrazine.HCl is prepared according to the method of Example 6, except that 5 grams of 3-pentanone is used instead of phenylacetone. Recrystallized from ethanol and ether: M.P.: 147° C.

Analysis. — $C_{14}H_{24}N_6O_2.HCl$: Calc. — Cl, 10.3%. Found.—Cl, 10.6%.

Example 9

13.7 grams of 7-(2'-hydrazinoethyl)-theophylline.HCl and 7 grams of tropinone in 60 cc. of water and 5 cc. of concentrated hydrochloric acid with 0.4 gram of $PtO_2$ catalyst are hydrogenated at room temperature at an initial pressure of 37 pounds. After 20 hours, the theoretical amount of hydrogen is absorbed. After filtration, the solution is evaporated under reduced pressure and the residue recrystallized from 250 cc. of ethanol. The thus-isolated N-(theophylline-7-ethyl)-N'-(tropyl)-hydrazine dihydrochloride melts at 145° C.

Analysis. — $C_{17}H_{27}N_7O_2.2HCl$: Calc. — Cl, 16.32%. Found.—Cl, 15.99%.

Example 10

N-(theophylline - 7 - ethyl)-N'-(4'-heptyl)-hydrazine hydrochloride is obtained similarly to the method of Example 6, except that in this case 6 grams of 4-heptanone is used instead of phenylacetone.

Recrystallized from ethanol: MP: 162° C.

Analysis. — $C_{15}H_{24}N_6O_2.HCl$: Calc. — Cl, 9.96%. Found Cl, 10.2%.

Example 11

13.7 grams of 7-(2'-hydrazinoethyl)-theophylline.HCl and 5 grams of cyclohexanone in 30 cc. of water and 40 cc. of ethanol with 0.4 gram of platinum oxide catalyst are hydrogenated at room temperature under an initial pressure of 35 pounds. After 3 hours the theoretical amount of hydrogen is absorbed. The filtered solution is evaporated under vacuum and the residue is crystallized from ethanol. The thus-isolated N-(theophylline-7-ethyl)-N'-(cyclohexyl)-hydrazine hydrochloride melts at 197° C.

Analysis. — $C_{15}H_{24}N_6O_2.HCl$: Calc.—Cl, 9.96%. Found—Cl, 10.2%.

Example 12

The N-(theophylline-7-ethyl)-N'-(cyclopentyl)-hydrazine hydrochloride is obtained by the method similar to that used for preparing the compound of Example 11, except that in this instance 5 grams of cyclopentanone is used instead of cyclohexanone. Recrystallized from ethanol: MP: 207° C.

Analysis. — $C_{14}H_{22}N_6O_2.HCl$: Calc. — Cl, 10.34%. Found—Cl, 10.6%.

Example 13

13.7 grams of 7-(2'-hydrazinoethyl)-theophylline hydrochloride and 7 grams of 1-diethylamino-3-butanone in 50 cc. of water and 5 cc. of concentrated hydrochloric acid with 0.4 gram of $PtO_2$ catalyst are hydrogenated at an initial pressure of 31 pounds. After 24 hours, the theoretical amount of hydrogen is adsorbed. After filtration, the solution is evaporated under reduced pressure and the residue crystallized from isopropanol and ether. The thus-isolated N-(theophylline-7-ethyl)-N'-(4'-diethylamino-2'-butyl)-hydrazine dihydrochloride melts at 187° C.

Analysis. — $C_{17}H_{31}N_7O_2.2HCl$: Calc. — Cl, 16.55%. Found—Cl, 16.31%.

The 7-(2'-chloro-ethyl)-theophylline is prepared as follows: 224 grams of 7-$\beta$-hydroxyethyl-theophylline in 100 cc. of dry benzene and 400 cc. of thionyl chloride are heated under reflux for 15 hours. The solvent is then evaporated; and the residue crystallized from 500 cc. of ethanol. There are obtained 181 grams of 7-(2'-chloroethyl)-theophylline having a melting point of 123° C.

It will be understood that the foregoing description of the invention and the examples set forth are merely illustrative of the principles thereof. Accordingly, the appended claims are to be construed as defining the invention within the full spirit and scope thereof.

We claim:
1. N - (theophylline - 7 - ethyl)-N'-(1'-benzyl-ethyl)-hydrazine.
2. N - (theophylline-7-ethyl)-N'-(1'-phenyl-ethyl)-hydrazine.

References Cited in the file of this patent
UNITED STATES PATENTS

| | | |
|---|---|---|
| 2,927,111 | Biel | Mar. 1, 1960 |
| 2,930,795 | Biel | Mar. 29, 1960 |